US012440657B2

(12) United States Patent
Thornley et al.

(10) Patent No.: US 12,440,657 B2
(45) Date of Patent: Oct. 14, 2025

(54) MECHANICAL DILATOR (71) Applicant: Bard Access Systems, Inc., Salt Lake City, UT (US)

(72) Inventors: Kyle G. Thornley, Farmington, UT (US); Daniel B. Blanchard, Bountiful, UT (US); Joe Spataro, Cottonwood Heights, UT (US); Alexander Kraemer, Salt Lake City, UT (US); Megan S. Scherich, Salt Lake City, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 354 days.

(21) Appl. No.: 17/525,774

(22) Filed: Nov. 12, 2021

(65) Prior Publication Data
US 2022/0152368 A1 May 19, 2022

Related U.S. Application Data (60) Provisional application No. 63/113,719, filed on Nov. 13, 2020.

(51) Int. Cl.
*A61M 29/00* (2006.01)
*A61M 25/09* (2006.01)

(52) U.S. Cl.
CPC ............ *A61M 29/00* (2013.01); *A61M 25/09* (2013.01)

(58) Field of Classification Search
CPC ............ A61M 29/00; A61M 25/09041; A61B 2017/2945; A61B 17/2833;
(Continued)

(56) References Cited

U.S. PATENT DOCUMENTS 2,566,499 A * 9/1951 Richter ............... A61M 25/065
604/161
2,842,133 A * 7/1958 Antoni ............... A61M 25/065
606/198
(Continued)

FOREIGN PATENT DOCUMENTS

CN 2456639 * 10/2001
CN 210844555 U 6/2020
(Continued)

OTHER PUBLICATIONS

PCT/US2021/061857 filed Dec. 3, 2021 International Search Report and Written Opinion dated Apr. 11, 2022.
(Continued)

*Primary Examiner* — William R Carpenter
(74) *Attorney, Agent, or Firm* — Rutan & Tucker LLP (57) ABSTRACT

A mechanical dilator is disclosed, which can include a first arm coupled to a second arm by a fulcrum, the first arm and the second arm cooperatively defining a lock and stop mechanism configured to limit lateral movement of the first arm with respect to the second arm. The mechanical dilator can further include a dilator body having a first side extending from the first arm and a second side extending from the second arm, where the fulcrum is configured to translate lateral movement of the first arm relative to the second arm to lateral movement of the first side relative to the second side.

26 Claims, 7 Drawing Sheets (58) Field of Classification Search
CPC .... A61B 2017/2946; A61B 2017/2947; A61B 2017/2837; A61B 17/2812
See application file for complete search history.

(56) References Cited

U.S. PATENT DOCUMENTS

| | | | |
|---|---|---|---|
| 3,921,631 | A | 11/1975 | Thompson |
| 4,324,044 | A | 4/1982 | Shahinian, Jr. |
| 4,392,856 | A | 7/1983 | Lichtenstein |
| 4,601,710 | A | 7/1986 | Moll |
| 4,693,250 | A * | 9/1987 | Coons ............... A61M 29/02 606/198 |
| 4,889,112 | A * | 12/1989 | Schachner ....... A61M 16/0472 128/207.29 |
| 4,955,890 | A | 9/1990 | Yamamoto et al. |
| 5,279,285 | A | 1/1994 | Griggs |
| 5,334,157 | A | 8/1994 | Klein et al. |
| 5,509,900 | A | 4/1996 | Kirkman |
| 5,755,697 | A | 5/1998 | Jones et al. |
| 5,800,450 | A | 9/1998 | Lary et al. |
| 5,843,115 | A | 12/1998 | Morejon |
| 6,033,388 | A | 3/2000 | Nordstrom et al. |
| 6,517,519 | B1 | 2/2003 | Rosen et al. |
| 6,761,725 | B1 * | 7/2004 | Grayzel ............... A61B 17/282 606/174 |
| 9,114,227 | B2 | 8/2015 | Blanchard |
| 9,480,498 | B1 | 11/2016 | Kessler |
| 10,028,762 | B1 | 7/2018 | Slupchynskyj |
| 10,376,675 | B2 | 8/2019 | Mitchell et al. |
| 2002/0040231 | A1 | 4/2002 | Wysoki |
| 2002/0165600 | A1 | 11/2002 | Banas et al. |
| 2003/0074013 | A1 | 4/2003 | Schooler et al. |
| 2004/0133227 | A1 | 7/2004 | Shang et al. |
| 2004/0181246 | A1 | 9/2004 | Heppler |
| 2004/0181273 | A1 * | 9/2004 | Brasington ........... A61M 29/02 606/191 |
| 2005/0177183 | A1 | 8/2005 | Thorne et al. |
| 2009/0024089 | A1 * | 1/2009 | Levine ................. A61M 29/00 606/191 |
| 2009/0076435 | A1 | 3/2009 | Melsheimer et al. |
| 2009/0125030 | A1 | 5/2009 | Tebbe et al. |
| 2010/0057056 | A1 | 3/2010 | Gurtner et al. |
| 2012/0130417 | A1 | 5/2012 | Lepulu et al. |
| 2012/0226299 | A1 | 9/2012 | Heppler |
| 2013/0197558 | A1 | 8/2013 | Ingold, Jr. et al. |
| 2016/0128713 | A1 | 5/2016 | Rauchwerger et al. |
| 2016/0346503 | A1 | 12/2016 | Jackson et al. |
| 2017/0128700 | A1 | 5/2017 | Roche Rebollo |
| 2017/0296792 | A1 | 10/2017 | Ornelas Vargas et al. |
| 2019/0307485 | A1 | 10/2019 | Kiev |
| 2019/0351183 | A1 | 11/2019 | Ishida |
| 2020/0061322 | A1 * | 2/2020 | De Rezende Neto ............ A61M 16/0472 |
| 2020/0086095 | A1 | 3/2020 | Kleinhaus |
| 2020/0155190 | A1 | 5/2020 | Basadonna et al. |
| 2020/0222077 | A1 | 7/2020 | Takahashi |
| 2020/0246597 | A1 | 8/2020 | Broniec et al. |
| 2021/0069471 | A1 | 3/2021 | Howell |
| 2021/0085927 | A1 | 3/2021 | Howell |
| 2021/0106351 | A1 | 4/2021 | Hossack et al. |
| 2021/0113809 | A1 | 4/2021 | Howell |
| 2021/0113810 | A1 | 4/2021 | Howell |
| 2021/0121661 | A1 | 4/2021 | Howell |
| 2021/0212722 | A1 | 7/2021 | Kiev et al. |
| 2022/0176081 | A1 | 6/2022 | Spataro et al. |
| 2023/0141739 | A1 | 5/2023 | Doctor et al. |
| 2023/0233227 | A1 | 7/2023 | Lindekugel et al. |
| 2023/0241353 | A1 | 8/2023 | Howell et al. |
| 2023/0241354 | A1 | 8/2023 | Howell |
| 2023/0255660 | A1 | 8/2023 | Howell |
| 2023/0255661 | A1 | 8/2023 | Howell |
| 2023/0277212 | A1 | 9/2023 | Howell |
| 2023/0277813 | A1 | 9/2023 | Howell |
| 2023/0277814 | A1 | 9/2023 | Howell |

FOREIGN PATENT DOCUMENTS

| | | | |
|---|---|---|---|
| CN | 111481303 A | 8/2020 | |
| CN | 112155683 A | 1/2021 | |
| DE | 10100332 A1 | 7/2002 | |
| DE | 202004012605 U1 | 10/2004 | |
| WO | WO-9108709 A1 * | 6/1991 | ............ A61B 17/00 |
| WO | WO-9412091 A1 * | 6/1994 | ............... A61B 1/32 |
| WO | 02087666 A2 | 11/2002 | |
| WO | 03022129 A2 | 3/2003 | |
| WO | WO-2011024013 A1 * | 3/2011 | ........ A61B 17/06109 |
| WO | 2011057282 A2 | 5/2011 | |
| WO | 2012087506 A2 | 6/2012 | |
| WO | 2016176065 A1 | 11/2016 | |
| WO | 2017006323 A1 | 1/2017 | |
| WO | 2020076691 A1 | 4/2020 | |
| WO | 2022104149 A1 | 5/2022 | |
| WO | 2022120201 A1 | 6/2022 | |
| WO | 2023081465 A1 | 5/2023 | |
| WO | 2023122313 A1 | 6/2023 | |
| WO | 2023141170 A1 | 7/2023 | |
| WO | 2023150263 A1 | 8/2023 | |
| WO | 2023150314 A1 | 8/2023 | |
| WO | 2023158643 A1 | 8/2023 | |
| WO | 2023158645 A1 | 8/2023 | |
| WO | 2023167943 A1 | 9/2023 | |
| WO | 2023168005 A1 | 9/2023 | |
| WO | 2023168097 A1 | 9/2023 | |

OTHER PUBLICATIONS

Rauchwerger, Jacob Jeffrey, Michael Serle, and Jeffrey C. Astbury. "Novel Wire-Guided Scalpel to Facilitate Central Venous Catheter Insertion without a Skin Bridge." Vascular Specialist International 37 (2021).
PCT/US2023/011067 filed Jan. 18, 2023 International Search Report and Written Opinion dated May 11, 2023.
PCT/US2023/012270 filed Feb. 3, 2023 International Search Report and Written Opinion dated Jun. 21, 2023.
PCT/US2023/012345 filed Feb. 3, 2023 International Search Report and Written Opinion dated Jun. 27, 2023.
PCT/US2023/013056 filed Feb. 14, 2023 International Search Report and Written Opinion dated Jun. 12, 2023.
PCT/US2023/013058 filed Jun. 7, 2023 International Search Report and Written Opinion dated Jun. 7, 2023.
PCT/US2023/014298 filed Mar. 1, 2023 International Search Report and Written Opinion dated Jun. 1, 2023.
PCT/US2023/014384 filed Mar. 2, 2023 International Search Report and Written Opinion dated Jun. 16, 2023.
PCT/US2023/014532 filed Mar. 3, 2023, International Search Report and Written Opinion dated Jul. 10, 2023.
U.S. Appl. No. 17/542,096, filed Dec. 3, 2021 Non Final Office Action dated Jun. 1, 2023.
PCT/US2022/049134 filed Nov. 7, 2022 International Search Report and Written Opinion dated Mar. 30, 2023.
PCT/US2022/053889 filed Dec. 22, 2022 International Search Report and Written Opinion dated Apr. 20, 2023.
U.S. Appl. No. 17/542,096, filed Dec. 3, 2021 Restriction Requirement dated Mar. 1, 2023.
PCT/US2021/059256 filed Nov. 12, 2021 International Search Report and Written Opinion dated Mar. 23, 2022.
U.S. Appl. No. 17/542,096, filed Dec. 3, 2021 Advisory Action dated Nov. 29, 2023.
U.S. Appl. No. 17/542,096, filed Dec. 3, 2021 Final Office Action dated Sep. 20, 2023.
U.S. Appl. No. 17/542,096, filed Dec. 3, 2021 Non-Final Office Action dated Jan. 18, 2024.
U.S. Appl. No. 17/542,096, filed Dec. 3, 2021 Final Office Action dated Aug. 1, 2024.
U.S. Appl. No. 18/116,748, filed Mar. 2, 2023 Non-Final Office Action dated May 21, 2025.

* cited by examiner

MECHANICAL DILATOR

PRIORITY

This application claims the benefit of priority to U.S. Patent Application No. 63/113,719, filed Nov. 13, 2020, which is incorporated by reference into this application.

BACKGROUND

During a medical device placement procedure, the tissue around the insertion site must be dilated or expanded to allow for the insertion of a medical device with a larger cross sectional diameter than the insertion site. The process to expand the tissue can involve multiple steps with multiple instruments. Furthermore, the clinician must visually determine how far the tissue around the insertion site must be expanded to facilitate the insertion of the medical device into the insertion site. Visual determination can lead to over expansion of the tissue. It would be beneficial to the clinician and the patient to be able to more precisely dilate the tissue around the insertion site using only one instrument. Disclosed herein is an apparatus, a system and a method that address the foregoing.

SUMMARY

Disclosed herein is a mechanical dilator including a first arm coupled to a second arm by a fulcrum, the first arm and the second arm cooperatively defining a lock and stop mechanism configured to limit lateral movement of the first arm with respect to the second arm, and a dilator body having a first side extending from the first arm and a second side extending from the second arm, wherein the fulcrum is configured to translate lateral movement of the first arm relative to the second arm to lateral movement of the first side relative to the second side.

In some embodiments, the first arm is closer to a distal end of the dilator body than the second arm or the second arm is closer to the distal end of the dilator body than the first arm.

In some embodiments, the first arm is laterally offset from the second arm.

In some embodiments, the dilator body includes a channel bisecting the dilator body into the first side and the second side. In some embodiments, the channel includes a consistent diameter and extends from the proximal end of each of the first arm and the second arm to a dilator tip.

In some embodiments, the lock and stop mechanism includes a first locking plate configured to slidably engage a second locking plate.

In some embodiments, the first locking plate is coupled to the first arm and the second locking plate is coupled to the second arm.

In some embodiments, the first locking plate and second locking plate each include a tab, a plurality of ridges, a recess and a stopping ridge.

In some embodiments, the mechanical dilator may be configured to transition between an opened configuration and a closed configuration.

In some embodiments, in the closed configuration, the first side and the second side are in physical contact.

In some embodiments, in the opened configuration, the first side and the second side are at a maximum possible distance apart, the first tab of the first locking plate is secured in the second recess of the second locking plate and the second tab of the second locking plate is secured in the first recess of the first locking plate.

In some embodiments, the dilator body is detachably coupled to the first arm and the second arm through a press fit, a snap fit, or an interference fit.

In some embodiments, the mechanical dilator is disposable or reusable.

In some embodiments, the proximal ends of each of the first arm and the second arm include chamfered edges.

Also disclosed herein is medical device insertion system including a guidewire, and a mechanical dilator configured to slide over the guidewire. In some embodiments, the mechanical dilator includes a first arm coupled to a second arm by a fulcrum, the first arm and the second arm cooperatively defining a lock and stop mechanism. The mechanical dilator also includes a dilator body comprising a first side extending from the first arm and a second side extending from the second arm, a channel configured to slide over the guidewire, the channel bisecting the dilator body into the first side and the second side, wherein the fulcrum is configured to translate movement of the first arm relative to the second arm to lateral movement of the first side relative to the second side.

In some embodiments, the lock and stop mechanism includes a first locking plate configured to slidably engage a second locking plate. The first locking plate includes a first tab, a first plurality of ridges, a first recess and a first stopping ridge and the second locking plate includes a second tab, a second plurality of ridges, a second recess and a second stopping ridge.

In some embodiments, the mechanical dilator is configured to transition from a closed configuration to an opened configuration.

In some embodiments, the closed configuration includes the first side and the second side being in physical contact.

In some embodiments, in the opened configuration, the first side and the second side are at a maximum possible distance apart and the first tab of the first locking plate is secured in the second recess of the second locking plate and the second tab of the second locking plate is secured in the first recess of the first locking plate.

In some embodiments, the mechanical dilator is slid over the guidewire in the closed configuration or the mechanical dilator is slid over the guidewire in the opened configuration.

In some embodiments, the channel includes a consistent diameter.

In some embodiments, the dilator tip is sharpened to facilitate entry of the dilator body into an insertion site.

Also disclosed herein is a method of using a mechanical dilator to dilate an insertion site including inserting guidewire into an insertion site, sliding the mechanical dilator over the guidewire into the insertion site, dilating the tissue surrounding the insertion site by moving the mechanical dilator from a closed confirmation to an opened configuration, and removing the mechanical dilator from the guidewire. In some embodiments, the mechanical dilator includes a first arm coupled to a second arm by a fulcrum, the first arm and the second arm cooperatively defining a lock and stop mechanism configured to limit lateral movement of the first arm with respect to the second arm; the mechanical dilator having a dilator body comprising a first side extending from the first arm and a second side extending from the second arm, a channel bisecting the dilator body into the first side and the second side, wherein the fulcrum is configured to translate lateral movement of the first arm relative to the second arm to lateral movement of the first side relative to the second side.

In some embodiments, the lock and stop mechanism includes a first locking plate coupled to the first arm and a second locking plate coupled to the second arm.

In some embodiments, the first locking plate includes a first tab, a first plurality of ridges, a first recess and a first stopping ridge and the second locking plate includes a second tab, a second plurality of ridges, a second recess and a second stopping ridge.

In some embodiments, in the closed configuration, the first side and the second side are in physical contact with each other.

In some embodiments, in the opened configuration, the first side and the second side are at a maximum possible distance apart, the first tab of the first locking plate is secured in the second recess of the second locking plate and the second tab of the second locking plate is secured in the first recess of the first locking plate.

In some embodiments, dilating the tissue surrounding the insertion site includes configuring the lock and stop mechanism to prevent over-dilation of the insertion site.

In some embodiments, dilating the issue surrounding the insertion site includes sliding an elongate medical device over the guidewire through the channel of the mechanical dilator into the insertion site, when the mechanical dilator is in the opened configuration.

In some embodiments, the elongate medical device includes a catheter.

In some embodiments, sliding the mechanical dilator over the guidewire includes sliding the mechanical dilator over the guidewire in the opened configuration.

In some embodiments, sliding the mechanical dilator over the guidewire includes sliding the mechanical dilator over the guidewire in the closed configuration.

In some embodiments, sliding the mechanical dilator over the guidewire includes transitioning the mechanical dilator from the opened configuration to the closed configuration before insertion into the insertion site.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal-end portion" of, for example, a mechanical dilator disclosed herein includes a portion of the mechanical dilator intended to be near a clinician when the mechanical dilator is used on a patient. Likewise, a "proximal length" of, for example, the mechanical dilator includes a length of the mechanical dilator intended to be near the clinician when the mechanical dilator is used on the patient. A "proximal end" of, for example, the mechanical dilator includes an end of the mechanical dilator intended to be near the clinician when the mechanical dilator is used on the patient. The proximal portion, the proximal-end portion, or the proximal length of the mechanical dilator can include the proximal end of the mechanical dilator; however, the proximal portion, the proximal-end portion, or the proximal length of the mechanical dilator need not include the proximal end of the mechanical dilator. That is, unless context suggests otherwise, the proximal portion, the proximal-end portion, or the proximal length of the mechanical dilator is not a terminal portion or terminal length of the mechanical dilator.

With respect to "distal," a "distal portion" or a "distal-end portion" of, for example, a mechanical dilator disclosed herein includes a portion of the mechanical dilator intended to be near or in a patient when the mechanical dilator is used on the patient. Likewise, a "distal length" of, for example, the mechanical dilator includes a length of the mechanical dilator intended to be near or in the patient when the mechanical dilator is used on the patient. A "distal end" of, for example, the mechanical dilator includes an end of the mechanical dilator intended to be near or in the patient when the mechanical dilator is used on the patient. The distal portion, the distal-end portion, or the distal length of the mechanical dilator can include the distal end of the mechanical dilator; however, the distal portion, the distal-end portion, or the distal length of the mechanical dilator need not include the distal end of the mechanical dilator. That is, unless context suggests otherwise, the distal portion, the distal-end portion, or the distal length of the mechanical dilator is not a terminal portion or terminal length of the mechanical dilator.

Unless defined otherwise, all technical and scientific terms used herein have the same meaning as commonly understood by those of ordinary skill in the art.

Figure 1A:
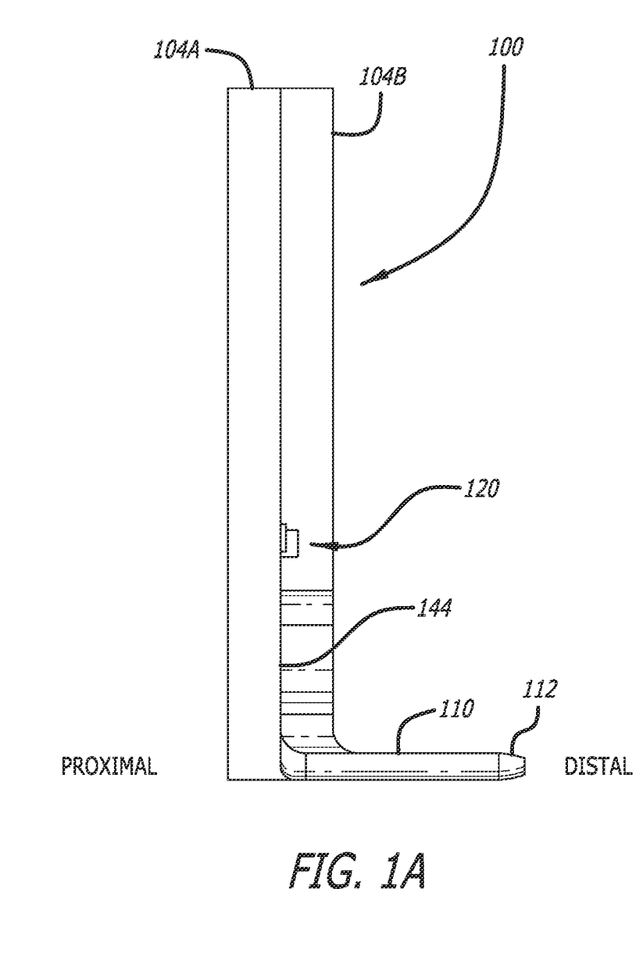
FIG. 1A illustrates a side view of a mechanical dilator, in accordance with some embodiments.

FIG. 1A illustrates a side view of a mechanical dilator 100, in accordance with some embodiments. In some embodiments, the mechanical dilator 100 includes a first arm 104A and a second arm 104B. In some embodiments, a dilator body 110 extends from a distal end of the first arm 104A and a distal end of the second arm 104B. In some embodiments, the dilator body 110 extends to a dilator tip 112. In some embodiments, the first arm 104A and the second arm 104B cooperatively define a lock and stop mechanism 120 that may be configured to limit lateral movement of the first arm 104A with respect to the second arm 104B. As illustrated in FIG. 1A, in some embodiments, the first arm 104A may be closer to a distal end of the dilator body 110 than the second arm 104B. In some embodiments, the second arm 104B may be closer to the distal end of the dilator body 110 than the first arm 104A. In some embodiments, the first arm 104A may be laterally offset from the second arm 104B.

Figure 1B:
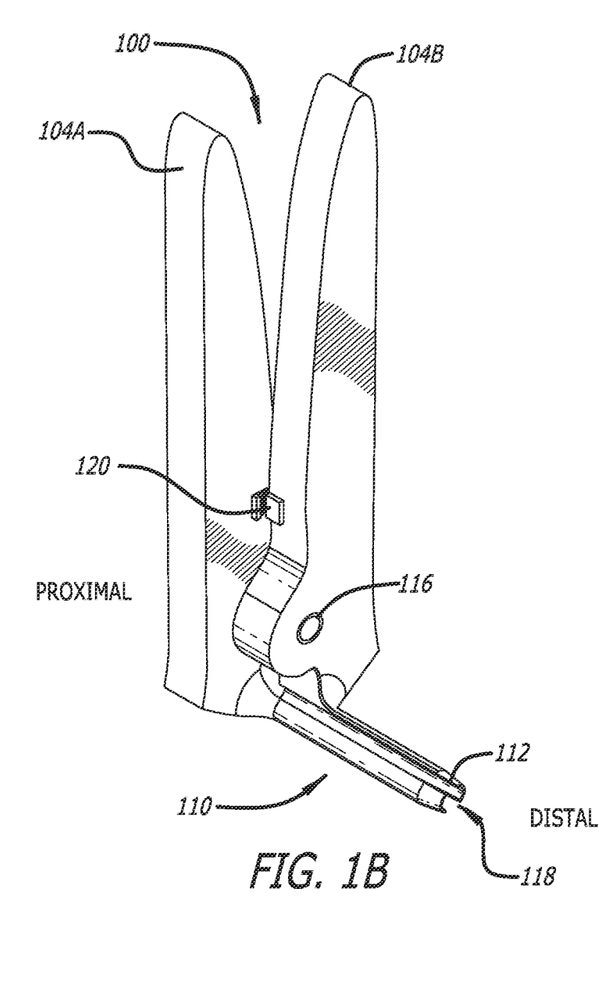
FIG. 1B illustrates a perspective view of the mechanical dilator, in accordance with some embodiments.

FIG. 1B illustrates a perspective view of the mechanical dilator 100, in accordance with some embodiments. In some embodiments, the mechanical dilator 100 may be configured to transition between a closed configuration and an opened configuration. In some embodiments, the first arm 104A may be compressed towards the second arm 104B. In some embodiments, a portion of the first arm 104A contacts a portion of the second arm 104B, as the first arm 104A and second arm 104B are compressed together. In some embodiments, the lock and stop mechanism 120 may be located where the first arm 104A contacts the second arm 104B. In some embodiments, the shape of the first arm 104A and the second arm 104B may include a rectangular prism, a tapered rectangular prism, a rounded rectangular prism, a cuboid, cylindrical, pentagonal prism, hexagonal prism, a combination thereof or the like. In some embodiments, the first arm 104A and the second arm 104B may be coupled together by a fulcrum 116 extending therebetween. In some embodiments, the fulcrum 116 translates lateral movement of the first arm 104A and the second arm 104B to movement of the dilator body 110, that will be described in more detail herein. In some embodiments, the dilator body 110 is bisected by a channel 118.

Figure 2A:
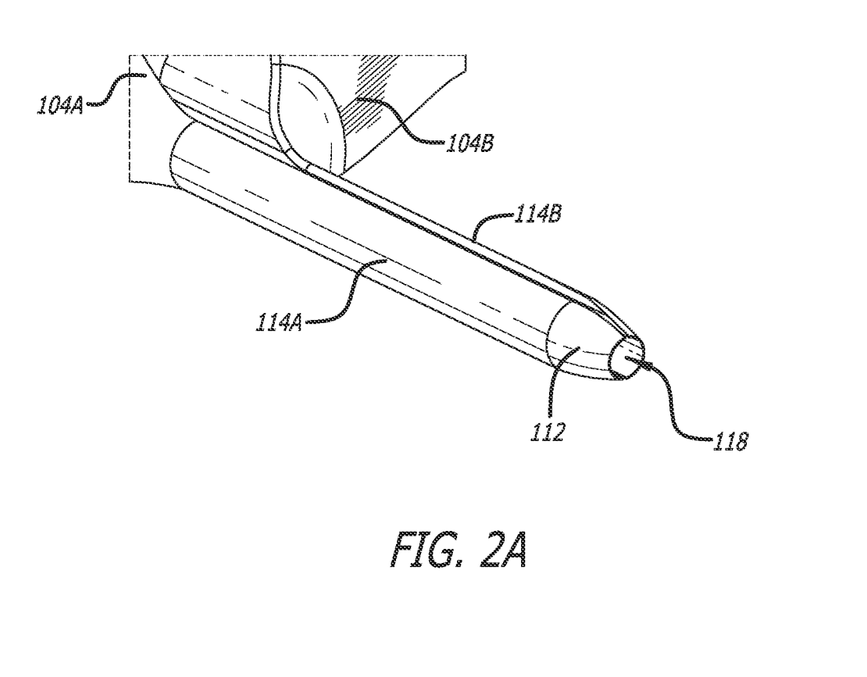
FIG. 2A illustrates a perspective view of the dilator body, in accordance with some embodiments.

FIG. 2A illustrates a perspective view of the dilator body 110, in accordance with some embodiments. As illustrated in FIG. 2A, the channel 118 divides the dilator body 110 into two equal sides, a first side 114A extending from the first arm 104A and a second side 114B extending from the second arm 104B. The dilator body 110 may be configured to expand or contract laterally through lateral movement of the first arm 104A and second arm 104B. In some embodiments, the dilator body 110 ends in the dilator tip 112 and the dilator tip 112 may be tapered. In some embodiments, the dilator tip 112 may be sharpened to facilitate entry of the dilator body 110 into an insertion site. In some embodiments, the dilator body 110 is cylindrical. However, other shapes are also contemplated. Advantageously, the cylindrical shape of the dilator body 110 allows for equal circumferential expansion of the tissue surrounding the insertion site. In some embodiments, equal circumferential expansion reduces the deflection of the skin and allows for consistent size of the insertion site leading to consistent placement of the medical device.

In an embodiment, the dilator body 110 may be detachably coupled to the first arm 104A and the second arm 104B. In an embodiment, the dilator body 110 may be press fit, snap fit, interference fit, or the like, to the first arm 104A and to the second arm 104B. In this embodiment, the mechanical dilator 100 and the dilator body 110 may be provided separately and then the dilator body 110 may be coupled to the first arm 104A and the second arm 104B before use. In some embodiments, various dilator bodies 110 having different diameters 117 of the channel 118 may be detachably coupled to the mechanical dilator 100. Having various dilator bodies 110 detachably coupled to the mechanical dilator 100 allows a user to select, right before use, the desired dilation of the insertion site. In some embodiments, the mechanical dilator 100 including the dilator body 110 may be constructed of metals (e.g., steel, aluminum, or the like), plastics (e.g., polyester, polyethylene, polyvinyl chloride, polypropylene, or the like), or a combination thereof. In some embodiments, the mechanical dilator 100 or portions thereof including the dilator body 110 may be configured to be reusable or disposable.

Figure 2B:
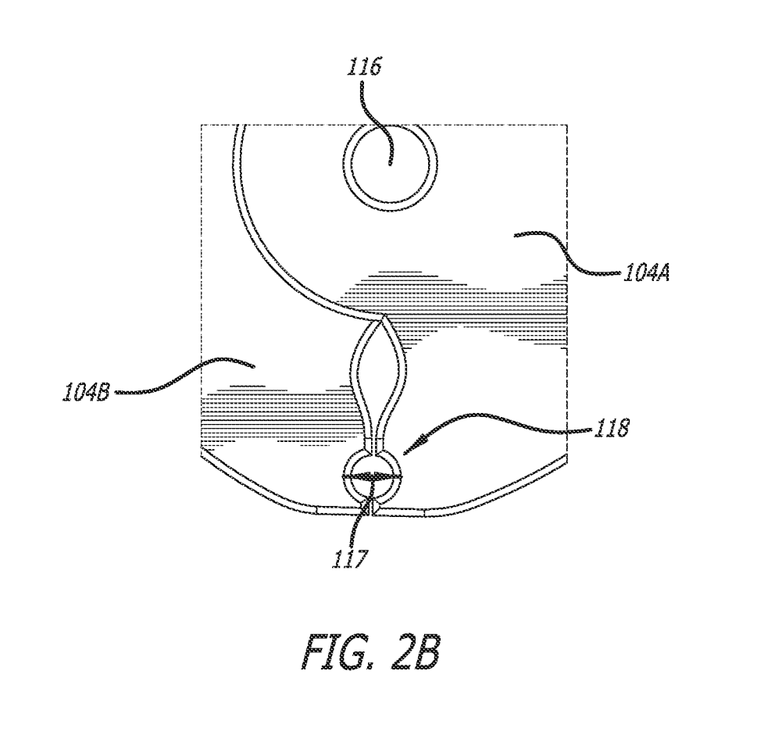
FIG. 2B illustrates a plan view of a proximal end of the dilator body including a channel, in accordance with some embodiments.

FIG. 2B illustrates the plan view of the first arm 104A and the second arm 104B of the mechanical dilator 100, in accordance with some embodiments. In some embodiments, the channel 118 extends from the proximal side of the mechanical dilator 100 to the dilator tip 112. In some embodiments, the channel 118 may be configured to have a consistent diameter 117 through the dilator body 110. In some embodiments, the proximal side of the channel 118 may include chamfered edges, configured to allows sliding of medical devices therein. As the dilator body 110 is expanded laterally, the diameter 117 of the channel 118 may also expand. As the dilator body 110 is expanded laterally, the diameter 117 of the channel 118 may also uniformly expand. In some embodiments, the diameter 117 of the channel 118 may expand to be greater than a cross sectional diameter of an elongate medical device, allowing a portion of the elongate medical device to be moved through the channel 118.

Figure 3A:
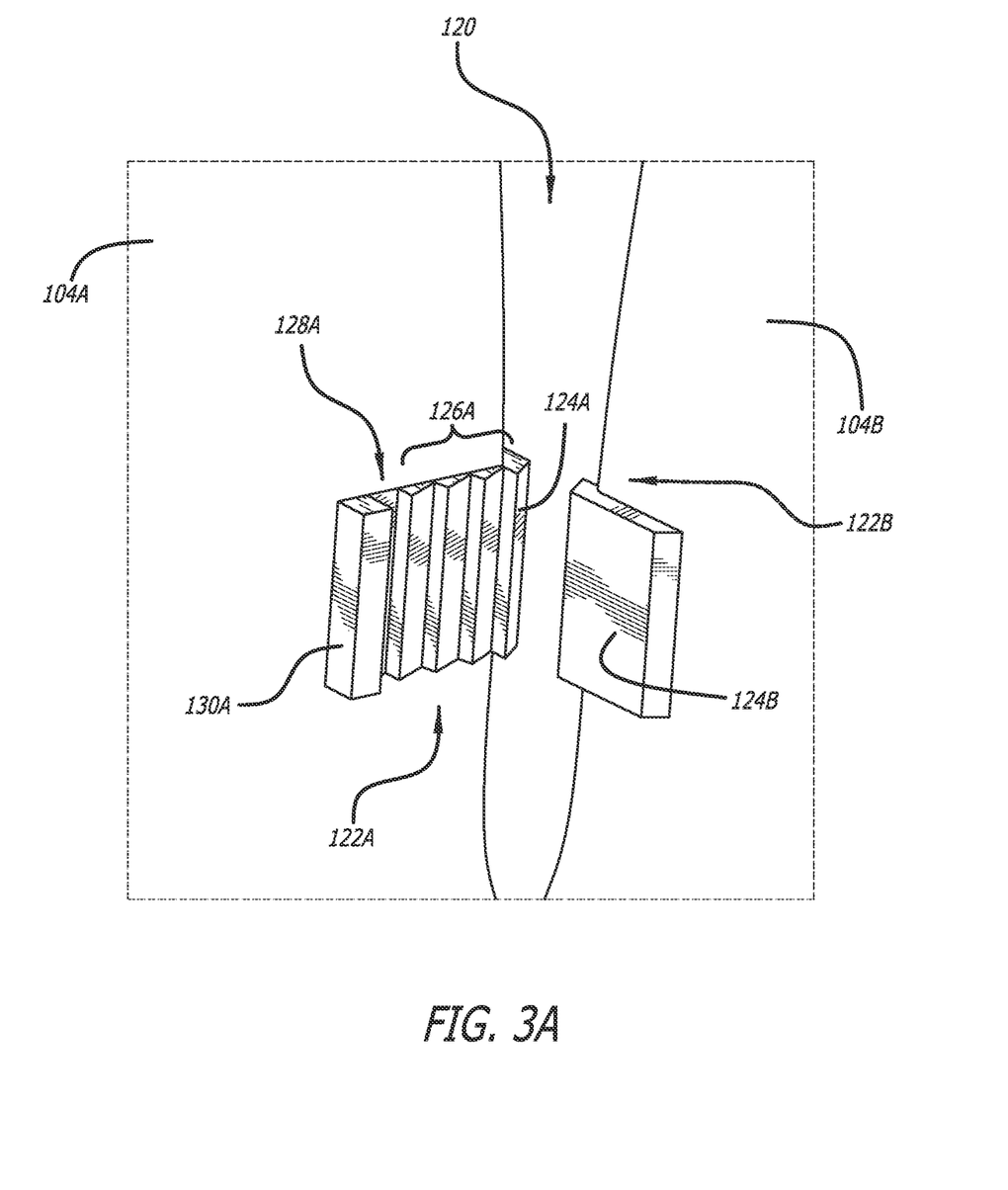
FIG. 3A illustrates a perspective view of a lock and stop mechanism coupled to the mechanical dilator, in accordance with some embodiments.

FIG. 3A illustrates a perspective view of a first locking plate 122A of the lock and stop mechanism 120, in accordance with some embodiments. In some embodiments, the mechanical dilator 100 may be configured to include a portion of the lock and stop mechanism 120 on the first arm 104A and a portion of the lock and stop mechanism 120 on the second arm 104B. In some embodiments, the lock and stop mechanism 120 includes the first locking plate 122A that may be configured to slidably engage a second locking plate 122B. In some embodiments, the first locking plate 122A includes a first tab 124A, a first plurality of ridges 126A protruding from the first locking plate 122A, a first recess 128A and a first stopping ridge 130A. In some embodiments, the first locking plate 122A may be configured to slidably engage a second tab 124B. In some embodiments, the mechanical dilator 100 may include the first locking plate 122A being coupled to the first arm 104A and the second tab 124B being coupled to the second arm 104B.

Figure 3B:
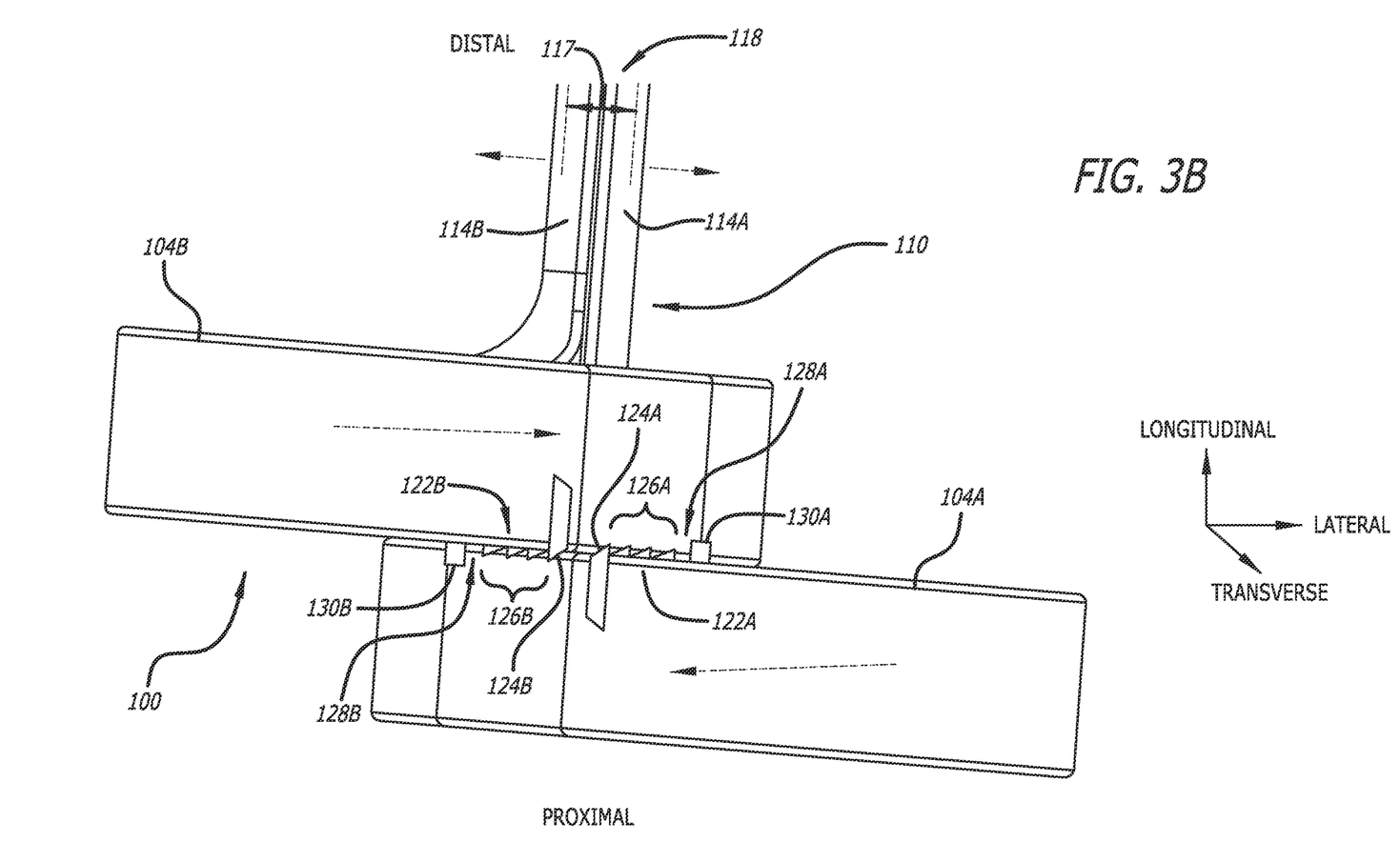
FIG. 3B illustrates a cross sectional view of the lock and stop mechanism coupled to the mechanical dilator, in accordance with some embodiments.

FIG. 3B illustrates a cross sectional view of the first locking plate 122A and the second locking plate 122B of the lock and stop mechanism 120 coupled to the mechanical dilator 100, in accordance with some embodiments. In some embodiments, the second locking plate 122B includes a second tab 124B, a second plurality of ridges 126B protruding from the second locking plate 122B, a second recess 128B and a second stopping ridge 130B. In some embodiments, the first locking plate 122A may be coupled to the first arm 104A and the second locking plate 122B may be coupled to the second arm 104B. As the first arm 104A and the second arm 104B are laterally compressed together, the first tab 124A is slidably engaged with the second plurality of ridges 126B, and the second tab 124B is slidably engaged with the first plurality of ridges 126A. The first arm 104A and second arm 104B may be laterally compressed together until the first tab 124A is secured within the second recess 128B and the second tab 124B is secured within the first recess 128A. The first stopping ridge 130A prevents the second tab 124B and the second arm 104B from further lateral movement and the second stopping ridge 130B prevents the first tab 124A and the first arm 104A from further lateral movement. The first stopping ridge 130A and the first recess 128A, and the second stopping ridge 130B and the second recess 128B ensures the channel 118 may be configured to open up to a maximum possible diameter. In some embodiments, the first plurality of ridges 126A may be configured to have the same number of ridges are the second plurality of ridges 126B. In some embodiments, each ridge within the first plurality of ridges 126A may be configured to have a corresponding ridge within the second plurality of ridges 126B.

In an embodiment, as the first tab 124A passes each ridge of the second plurality of ridges 126B and the second tab 124B passes each ridge of the first plurality of ridges 126A, the user may be notified about the progress of the first tab 124A over the second plurality of ridges 126B and the second tab 124B over the second plurality of ridges 126B with an audible sound (e.g., a click, a pop, or the like). In this embodiment, the audible sound of the first tab 124A passing over each ridge of the second plurality of ridges 126B and the second tab 124B passing over each ridge of the first plurality of ridges 126A may correspond to an incremental increase in the expansion of the dilator body 110. In some embodiments, the lock and stop mechanism 120 may include a visual indicator of the progress of the first tab 124A over the second plurality of ridges 126B and the second tab over the second plurality of ridges 126B. In an embodiment, the visual indicator may include each ridge of the first plurality of ridges 126A and each corresponding ridge of the second plurality of ridges 126B having a distinct color that corresponds to a specific diameter of the channel 118. In this embodiment, the user may be able to visually determine the dilation progress of the dilator body 110 and the diameter 117 of the channel 118. In some embodiments, the audible sound and the visual indicator of the progress of the first tab 124A passing over each ridge of the second plurality of ridges 126B and the second tab 124B passing over each ridge of the first plurality of ridges 126A may be combined to give the user two different mechanisms to determine the dilation progress of the dilator body 110 and the diameter 117 of the channel 118.

In some embodiments, the lock and stop mechanism 120 may be pre-configured for a maximum diameter 117 of the channel 118 or a maximum distance between the first side 114A and the second side 114B. For example, the maximum diameter 117 of the channel 118 may be configured to be greater than the diameter of a user selected elongate medical device. In some embodiments, the number of ridges, in the first plurality of ridges 126A before the first recess 128A and the number of ridges in the second plurality of ridges 126B before the second recess 128B, may be increased, to be configured to increase the maximum diameter of the channel 118. In some embodiments, the user may desire a diameter of the channel 118 that may be less than the maximum diameter of the channel 118. The user may stop the progress of the first tab 124A and second tab 124B anywhere along the first and second plurality of ridges 126A/126B before the second tab 124B is slidably engaged in the first recess 128A and the first tab is slidably engaged in the second recess 128B.

In some embodiments, each ridge in each of the first plurality of ridges 126A or the second plurality of ridges 126B may correspond to an increase in diameter of the channel 118. In some embodiments, each ridge in the each of the first plurality of ridges 126A and the second plurality of ridges 126B may correspond to an increased diameter of the channel 118 corresponding to the French catheter scale. For example, in a mechanical dilator 100 that includes five ridges and one recess in the first plurality of ridges and the second plurality of ridges, passing the first tab 124A over the first ridge of the second plurality of ridges 126B and the second tab 124B over the first ridge of the second plurality of ridges may expand the channel diameter 117 to fit a 12 French catheter therein. Passing the first tab 124A over the second ridge of the second plurality of ridges and the second tab 124B over the second ridge of the second plurality of ridges may expand the channel diameter 117 to fit a 13 French catheter therein. Securing the first tab 124A in the second recess of the second locking plate 122B and the second tab 124B in the first recess of the first locking plate 122A may expand the channel diameter 117 to fit a 17 French catheter therein.

Figure 4A:
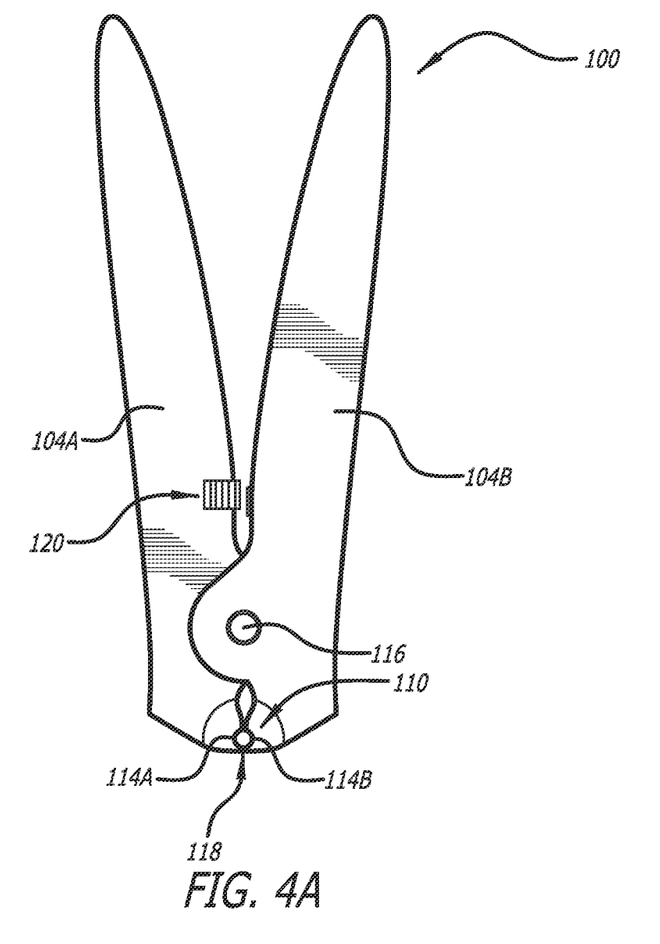
FIGS. 4A-4B illustrate a plan view of an exemplary method of dilating a mechanical dilator, in accordance with some embodiments.
Figure 4B:
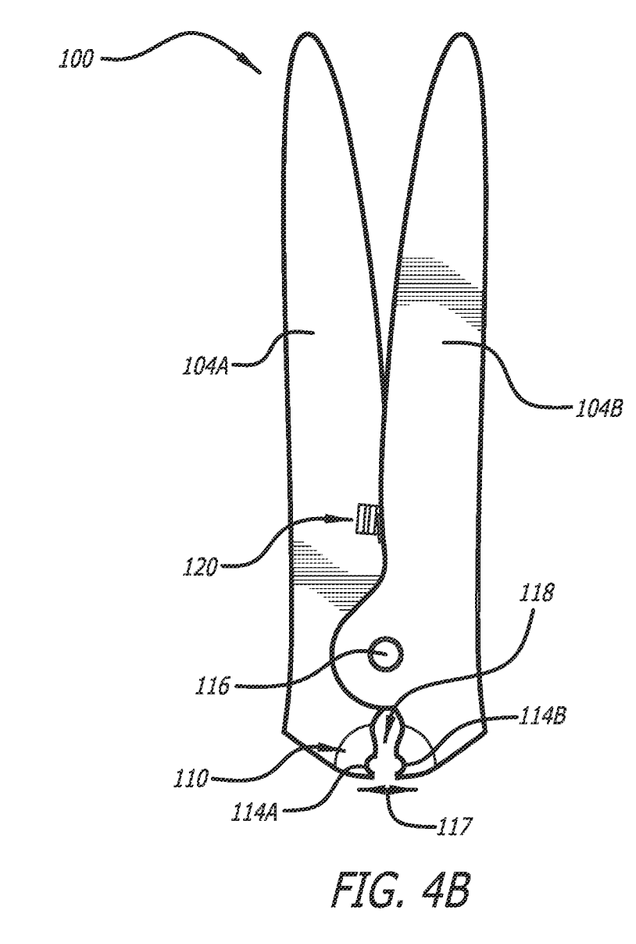

FIGS. 4A-4B illustrate a plan view of an exemplary method of dilating the mechanical dilator 100, in accordance with some embodiments. The fulcrum 116 allows the lateral movement of the first arm 104A with respect to the second arm 104B to translate to an increase or decrease of the diameter 117 of the channel 118, and the first side 114A and second side 114B being moved laterally closer together or further apart. As illustrated in FIG. 4A, the first arm 104A may be configured to move laterally away from the second arm 104B. Moving the first arm 104A away from the second arm 104B decreases the diameter 117 of the channel 118 and brings the first side 114A and the second side 114B laterally together. In some embodiments, the mechanical dilator 100 may be configured in the closed configuration, when the first side 114A and the second side 114B are in physical contact.

As illustrated in FIG. 4B, compressing the first arm 104A and second arm 104B laterally together increases the diameter 117 of the channel 118, breaking the physical contact between the first side 114A and the second side 114B. In some embodiments, the mechanical dilator 100 may be configured in the opened configuration, when the first side 114A and the second side 114B are no longer in physical contact and are the maximum allowed distance apart. In other words, the opened configuration of the mechanical dilator 100 includes when the first arm 104A and the second arm 104B are laterally compressed together and the channel diameter 117 is the maximum diameter as allowed by the user and the lock and stop mechanism 120. In some embodiments, the mechanical dilator 100 may be slid into an insertion site in the closed configuration. In some embodiments, transitioning the mechanical dilator 100 between the closed configuration and the open configuration dilates the insertion site including one or more of the surrounding tissues, as will be described in more detail herein. In some embodiments, the mechanical dilator may be biased to the closed configuration by the inclusion of a biasing member (e.g. a spring). In some embodiments, the mechanical dilator may be biased to the opened configuration by the inclusion of a biasing member (e.g. a spring). In some embodiments, once the mechanical dilator 100 has been transitioned from the closed configuration to the opened configuration, the mechanical dilator may not be transitioned back to the closed configuration. In some embodiments, once the mechanical dilator 100 has transitioned from the closed configuration to the opened configuration, the mechanical dilator 100 may be transitioned back to the closed configuration by manually resetting the lock and stop mechanism 120.

Figure 5A:
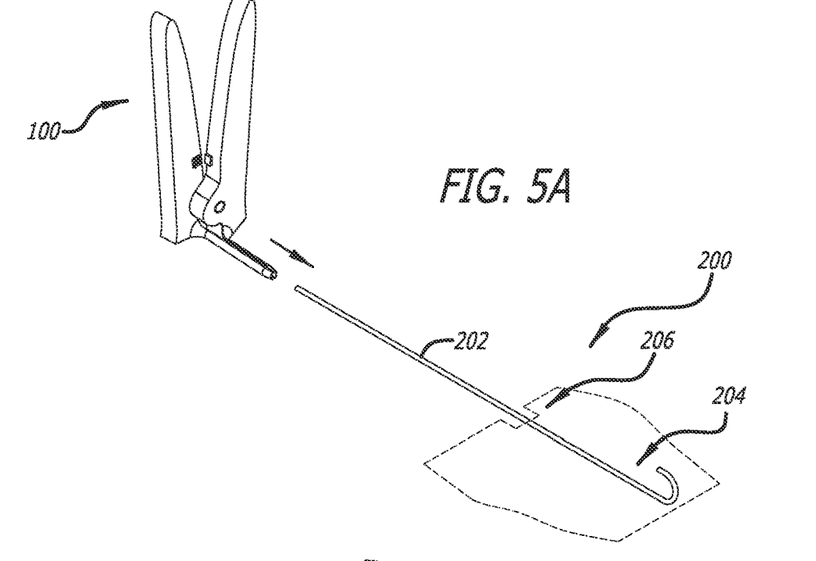
FIGS. 5A-5C illustrate a perspective view of an exemplary method of using a mechanical dilator in a medical device insertion system, in accordance with some embodiments.
Figures 5B, 5C:
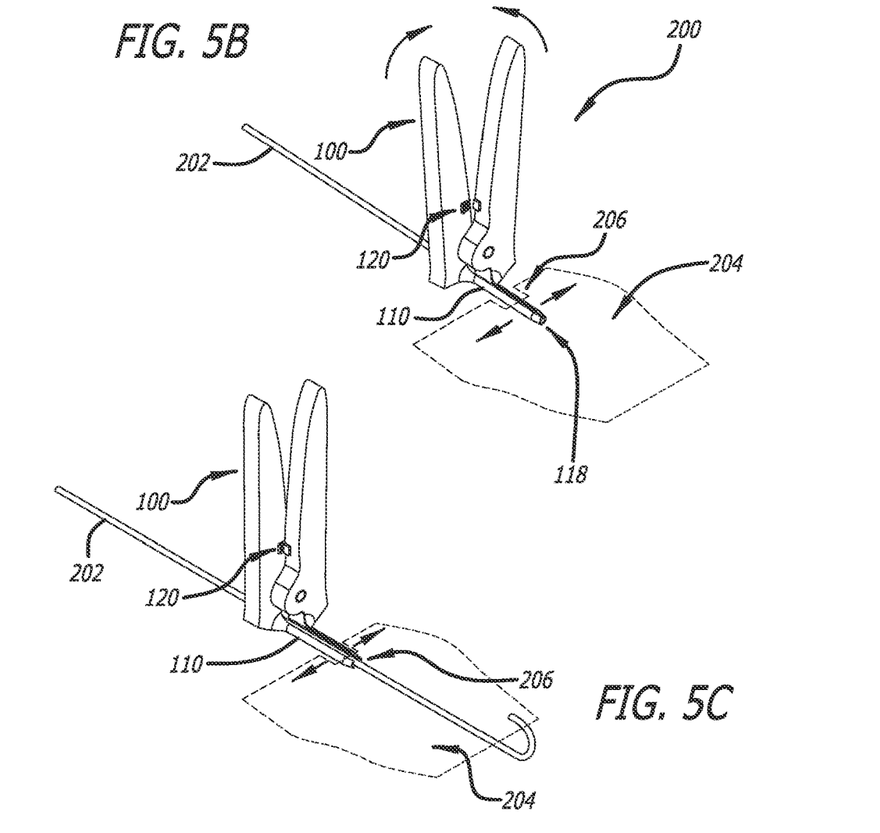

FIGS. 5A-5C illustrate an exemplary method of using a mechanical dilator 100 in a medical device insertion system 200, in accordance with some embodiments. In some embodiments, the medical device insertion system 200 includes a guidewire 202 and a mechanical dilator 100. As illustrated in FIG. 5A, the guidewire 202 may be inserted into a target area 204, through an insertion site 206. In some embodiments, once the guidewire 202 is inserted, the mechanical dilator 100, more specifically the dilator body 110, may be configured to slide over the guidewire 202 in the closed confirmation to slidably engage the insertion site 206 as illustrated in FIG. 5B. More specifically, the guidewire 202 may be inserted through the channel 118 and the mechanical dilator 100 may be slid over the guidewire 202. In some embodiments, the mechanical dilator 100 may be slid over the guidewire 202 in the opened configuration and then transitioned to the closed configuration before insertion into the insertion site 206. In some embodiments, as illustrated in FIG. 5C, once the mechanical dilator 100 is engaged in the insertion site 206, the mechanical dilator 100 may be configured to dilate the insertion site 206 by laterally compressing the first arm 104A with respect to the second arm 104B, laterally expanding the first side 114A with respect to the second side 114B or simply stated, from the closed configuration to the opened configuration. In some embodiments, the lock and stop mechanism 120 may be configured to prevent over dilation of the tissue surrounding the insertion site 206.

Figure 6:
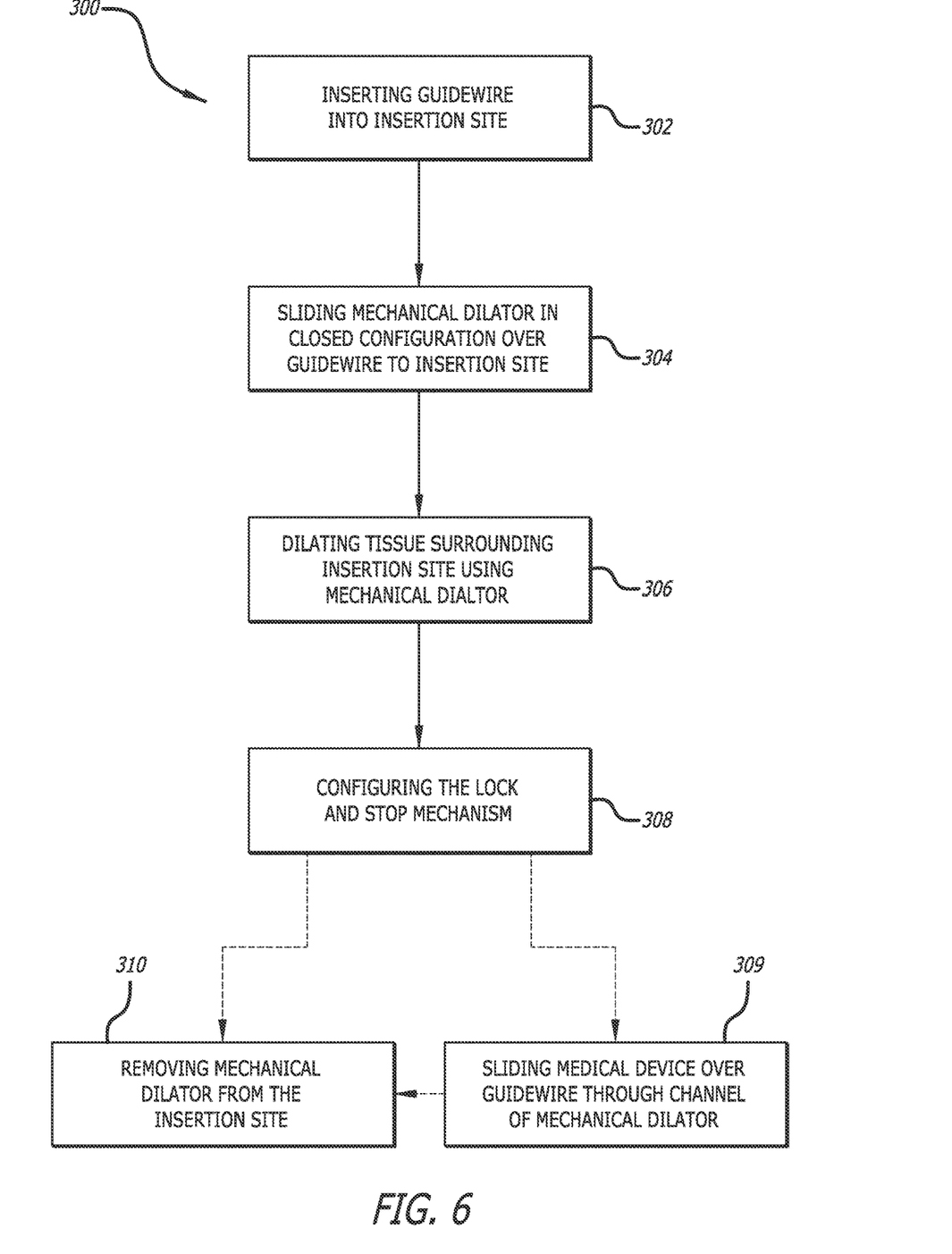
FIG. 6 illustrates a flow diagram of an exemplary method of using a mechanical dilator to dilate the tissue around an insertion site, in accordance with some embodiments.

FIG. 6 illustrates a flow diagram of an exemplary method 300 of using the mechanical dilator 100 to place an elongate medical device, in accordance with some embodiments. In some embodiments, the method 300 includes inserting a guidewire 202 into an insertion site 206 in a target area 204 (block 302). In some embodiments, the target area 204 may include an anatomical target (e.g., a blood vessel or the like). In some embodiments, the guidewire 202 may be inserted into the insertion site 206 through an insertion needle. The method 300 further includes sliding the mechanical dilator 100, in the closed configuration, over the guidewire 202 to slidably engage the insertion site 206 (block 304). In some embodiments, the dilator body 110 may be slid into the insertion site 206 until a portion of the dilator body 110 is no longer visible. In some embodiments, the dilator body 110 may be slid into the insertion site until the entire dilator body 110 is no longer visible. In some embodiments, the mechanical dilator 100 may be slid over the guidewire 202 in the opened configuration and transitioned to the closed configuration before insertion into the insertion site 206.

The method 300 further includes dilating the tissue surrounding the insertion site 206 using the mechanical dilator 100 (block 306). In some embodiments, dilating the tissue surrounding the insertion site 206 includes laterally compressing the first arm 104A with respect to the second arm 104B to expand the first side 114A away from the second side 114B expanding the channel 118. The method 300 further includes configuring the lock and stop mechanism 120 to prevent over-dilation of the insertion site 206. (block 308). In some embodiments, configuring the lock and stop mechanism 120 includes laterally compressing a first arm 104A with respect to a second arm 104B until a first tab 124A is secured in a second recess 128B of a second locking plate 122B and a second tab 124B is secured in the first recess 128A of a first locking plate 122A. In some embodiments, configuring the lock and stop mechanism 120 includes laterally compressing the first arm 104A with respect to the second arm 104B until the first tab 124A is secured in one of the ridges of a second plurality of ridges of the second locking plate and the second tab 124B is secured in one of the ridges of a first plurality of ridges of the first locking plate 122A.

The method 300 further includes removing the mechanical dilator 100 from the insertion site 206 (block 310). In some embodiments, removing the mechanical dilator 100 from the insertion site 206 includes removing the mechanical dilator 100 from the insertion site 206 in the opened configuration. In some embodiments, the method 300 includes an optional step of sliding an elongate medical device over the guidewire 202, through a channel 118 of the mechanical dilator 100 into the insertion site 206 (block 309). In some embodiments, the elongate medical device may include a catheter or a stylet. Advantageously, inserting the mechanical dilator 100 over the guidewire 202 to the insertion site ensures that the dilation of the tissue occurs along the pathway the elongate medical device will take.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A mechanical dilator, comprising:
  a first arm coupled to a second arm by a fulcrum, the first arm and the second arm cooperatively defining a lock and stop mechanism configured to limit lateral movement of the first arm with respect to the second arm; and
  a dilator body defining a proximal end and a distal end, the dilator body comprising:
    a first side extending from the first arm;
    a second side extending from the second arm; and
    a straight channel bisecting the dilator body into the first side and the second side, the straight channel extending from the proximal end of the dilator body to the distal end of the dilator body,
  wherein:
    the fulcrum is configured to translate compressing lateral movement of the first arm relative to the second arm to expanding lateral movement of the first side relative to the second side, the lock and stop mechanism defines a plurality of discrete locked positions of the first arm with respect to the second arm,
the plurality of discrete locked positions define discrete diameters of the straight channel that range from a diameter corresponding to a 12 French catheter to a diameter corresponding to a 17 French catheter, and
each discrete diameter corresponds to respective ones of a 12 French, a 13 French, a 14 French, a 15 French, a 16 French, and a 17 French catheter.

2. The mechanical dilator according to claim 1, wherein the first arm is closer to the distal end of the dilator body than the second arm.

3. The mechanical dilator according to claim 1, wherein the first arm is laterally offset from the second arm.

4. The mechanical dilator according to claim 1, wherein the straight channel includes a consistent diameter extending from the proximal end of the dilator body to the distal end of the dilator body.

5. The mechanical dilator according to claim 1, wherein the lock and stop mechanism includes a first locking plate configured to slidably engage a second locking plate.

6. The mechanical dilator according to claim 5, wherein the first locking plate is coupled to the first arm and the second locking plate is coupled to the second arm.

7. The mechanical dilator according to claim 6, wherein the first locking plate and the second locking plate each include a tab, a plurality of ridges, a recess, and a stopping ridge.

8. The mechanical dilator according to claim 1, wherein the dilator body is configured to transition between an opened configuration and a closed configuration.

9. The mechanical dilator according to claim 8, wherein in the closed configuration, the first side, and the second side are in physical contact.

10. The mechanical dilator according to claim 8, wherein in the opened configuration, the first side, and the second side are at a maximum possible distance apart, a first tab of a first locking plate is secured in a second recess of a second locking plate and a second tab of the second locking plate is secured in a first recess of the first locking plate.

11. The mechanical dilator according to claim 1, wherein the dilator body is detachable from the first arm and the second arm, such that the dilator body can be discarded after use, and the first arm and the second arm can be reused.

12. The mechanical dilator according to claim 11, wherein the dilator body is detachably coupled to the first arm and the second arm through a press fit, a snap fit, or an interference fit.

13. The mechanical dilator according to claim 1, wherein the mechanical dilator is disposable.

14. The mechanical dilator according to claim 4, wherein the proximal end of the dilator body includes chamfered edges at proximal ends of each of the first side and the second side, the chamfered edges configured to allow a medical device to be slidably inserted into the straight channel.

15. The mechanical dilator according to claim 4, wherein the dilator body includes a conical taper to define a dilator tip that is sharpened to facilitate entry of the dilator body into an insertion site.

16. The mechanical dilator according to claim 1, wherein the dilator body forms right angle with the first arm and the second arm.

17. The mechanical dilator according to claim 1, wherein a rotational axis of the fulcrum is disposed parallel with the straight channel.

18. A medical device insertion system comprising:
a guidewire;
a mechanical dilator configured to slide over the guidewire, the mechanical dilator having a first arm coupled to a second arm by a fulcrum, the first arm and the second arm cooperatively defining a lock and stop mechanism; and
a dilator body defining a proximal end and a distal end, the dilator body comprising:
a first side extending from the first arm;
a second side extending from the second arm; and a straight channel configured to slide over the guidewire,
the straight channel bisecting the dilator body into the first side and the second side and extending from the proximal end of the dilator body to the distal end of the dilator body,
wherein:
the fulcrum is configured to translate compressing lateral movement of the first arm relative to the second arm to expanding lateral movement of the first side relative to the second side,
the lock and stop mechanism defines a plurality of discrete locked positions of the first arm with respect to the second arm,
the plurality of discrete locked positions define discrete diameters of the straight channel that range from a diameter corresponding to a 12 French catheter to a diameter corresponding to a 17 French catheter, and
each discrete diameter corresponds to respective ones of a 12 French, a 13 French, a 14 French, a 15 French, a 16 French, and a 17 French catheter.

19. The medical device insertion system according to claim 18, wherein the lock and stop mechanism includes a first locking plate configured to slidably engage a second locking plate.

20. The medical device insertion system according to claim 19, wherein:
the first locking plate includes a first tab, a first plurality of ridges, a first stopping ridge, and a first recess disposed between the first plurality of ridges and the first stopping ridge, and
the second locking plate includes a second tab, a second plurality of ridges, a second stopping ridge, and a second recess disposed between the second plurality of ridges and the second stopping ridge.

21. The medical device insertion system according to claim 20, wherein the mechanical dilator is configured to transition from a closed configuration to an opened configuration.

22. The medical device insertion system according to claim 21, wherein in the closed configuration the first side and the second side are in physical contact.

23. The medical device insertion system according to claim 21, wherein in the opened configuration, the first side and the second side are at a maximum possible distance apart, the first tab of the first locking plate is secured in the second recess of the second locking plate and the second tab of the second locking plate is secured in the first recess of the first locking plate.

24. The medical device insertion system according to claim 22, wherein the mechanical dilator is slid over the guidewire in the closed configuration.

25. The medical device insertion system according to claim 18, wherein the straight channel includes a consistent diameter that extends from the proximal end of the dilator body to the distal end of the dilator body.

26. The medical device insertion system according to claim 25, wherein the dilator body includes a conical taper to define a dilator tip that is sharpened to facilitate entry of the dilator body into an insertion site.

\* \* \* \* \*